United States Patent [19]

Sato

[11] Patent Number: 4,542,961
[45] Date of Patent: Sep. 24, 1985

[54] TRIPLET TYPE OBJECTIVE

[75] Inventor: Yasuhisa Sato, Kanagawa, Japan

[73] Assignee: Canon Kabushiki Kaisha, Tokyo, Japan

[21] Appl. No.: 583,938

[22] Filed: Feb. 27, 1984

[30] Foreign Application Priority Data

Mar. 3, 1983 [JP] Japan .................. 58-35075
Mar. 3, 1983 [JP] Japan .................. 58-35076

[51] Int. Cl.$^4$ .................. G02B 9/14; G02B 13/18
[52] U.S. Cl. .................. 350/475; 350/432; 350/449
[58] Field of Search .................. 350/449, 475, 432

[56] References Cited

U.S. PATENT DOCUMENTS 3,578,847  5/1971  Grey .................. 350/475
3,773,404 11/1973  Moore .................. 350/475
3,784,287  1/1974  Grey .................. 350/475
3,912,379 10/1975  DeJager .................. 350/449 X

FOREIGN PATENT DOCUMENTS 57-2012  1/1982  Japan .................. 350/475

Primary Examiner—John K. Corbin
Assistant Examiner—Scott J. Sugarman
Attorney, Agent, or Firm—Toren, McGeady, Stanger, Goldberg & Kiel

[57] ABSTRACT

The disclosed triplet type objective includes from front to rear, a first lens of positive power, a second lens of negative power and a third lens of positive power followed by a diaphragm, with at least one of the refracting surfaces of the second and third lenses being aspheric. To shape this aspheric surface with reference to a spherical surface for determining the focal length of the lens, numerical ranges are given for the axial distances between the aspheric and spherical surfaces at a maximum value and its half value for aspherical effectiveness from the optical axis. Satisfying these specified ranges makes it possible to correct all aberrations well, improve the compactness, and increase in the image angle.

5 Claims, 11 Drawing Figures

TRIPLET TYPE OBJECTIVE

BACKGROUND OF THE INVENTION

1. Field of the Invention

This invention relates to triplet type objectives with a diaphragm arranged behind the lens system.

2. Description of the Prior Art

Triplet objectives with three components of positive, negative and positive powers from the front are well known. Because this type of lens offers a relatively high optical performance with a small number of lens elements, it has been widely used as a photographic lens for many years. Triplet objectives have also been used in so-called rear stop arrangements, namely, with a diaphragm in rear of the lens system. Such a rear stop type lens does not require moving the operating mechanism for the stop even when the entire lens system is moved to effect focusing. This affords the advantage of permitting the structure of the focusing mechanism to be simple.

Such rear stop type triplet objectives have been proposed, for example, in Japanese Patent Publications Nos. SHO 48-5494 and SHO 50-2807. However, these objectives have narrow total angular field coverages such as 55°. Another objective proposed in Japanese Laid-Open Patent Publication No. SHO 57-2012 has relatively wide an angular field. However it is somewhat dark with an F-number of f/4. Also, because the ratio of the distance from the front vertex to the image plane to the focal length, or the so-called telephoto ratio assumes a value of greater than 1.1, the total length of the lens system is relatively long.

SUMMARY OF THE INVENTION

With the foregoing in mind, it is an object of the present invention to provide a rear stop type triplet objective of a wider total angular field coverage with a faster speed and a smaller size than were heretofore possible.

Another object of the invention is to provide a rear stop type triplet objective having a total angular field coverage of about 65° and a relative aperture of about f/3.5 with a telephoto ratio of nearly unity.

DETAILED DESCRIPTION OF THE PREFERRED EMBODIMENTS

In general, with the triplet type, shortening the total length of the lens system requires increasing the refractive power of each of the components. As a result, each refracting surface becomes so intense in curvature that the Petzval sum increases to a positive direction. Therefore, extreme under-correction of the sagittal image surface for the intermediate zone of the field results, and astigmatism, halo and coma are also increased. Thus, the imaging performance of the objective tends to become extremely low. A problem arises because it is at the front surface of the second lens that the refracting action of divergence for the most marginal rays of an oblique pencil becomes too large. Specifically, the comatic flare in that area of the picture format which is from the intermediate to the corners is increased objectionably.

The present invention is to achieve good correction of the various aberrations and particularly the comatic flare in this intermediate area to the corners of the picture format by introducing an aspheric surface or surfaces, thus realizing a lens system of lesser flare with higher contrast for improved imaging performance over the entire area of the picture format. Previous proposals for the employment of an aspheric surface in the triplet type of lens are, for example, disclosed in U.S. Pat. Nos. 3,905,686, 3,910,685, 3,944,337 and 3,967,884.

Figure 1:
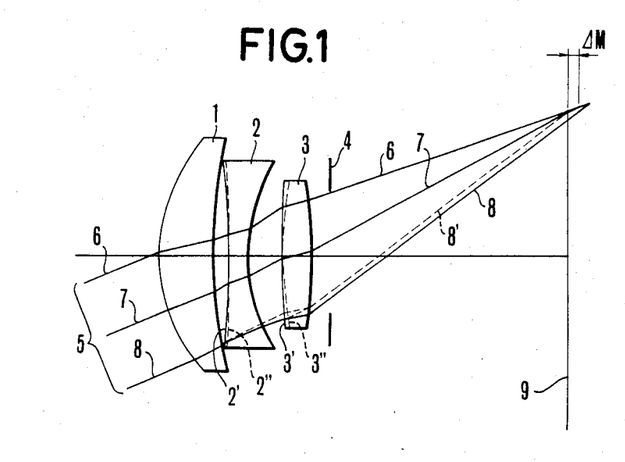
FIG. 1 is a diagram of geometry to explain an effect produced by the use of an aspheric surface in a triplet objective.
Figure 2:
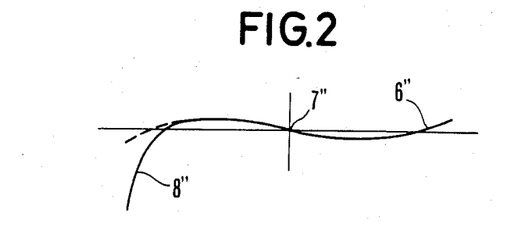
FIG. 2 graphically illustrates a difference between the states of correction of an aberration with and without the use of the aspheric surface of FIG. 1.
Figure 3:
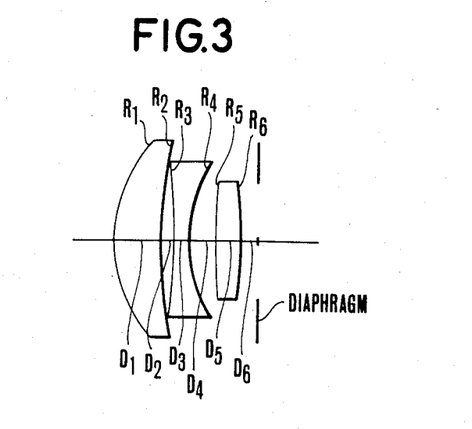
FIG. 3 is a schematic diagram of generally representing all the specific embodiments of the triplet objective according to the present invention.
Figure 4:
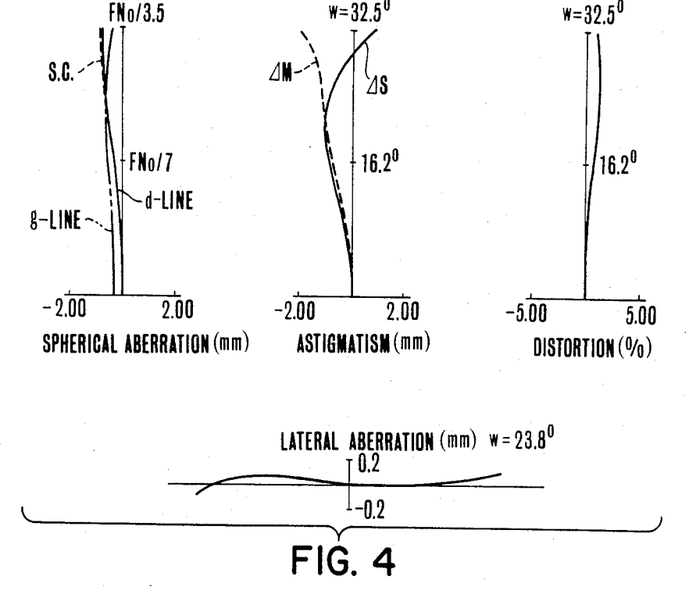
FIG. 4 is a graphic representation of the various aberrations of a first specific numerical example of the invention.
Figure 5:
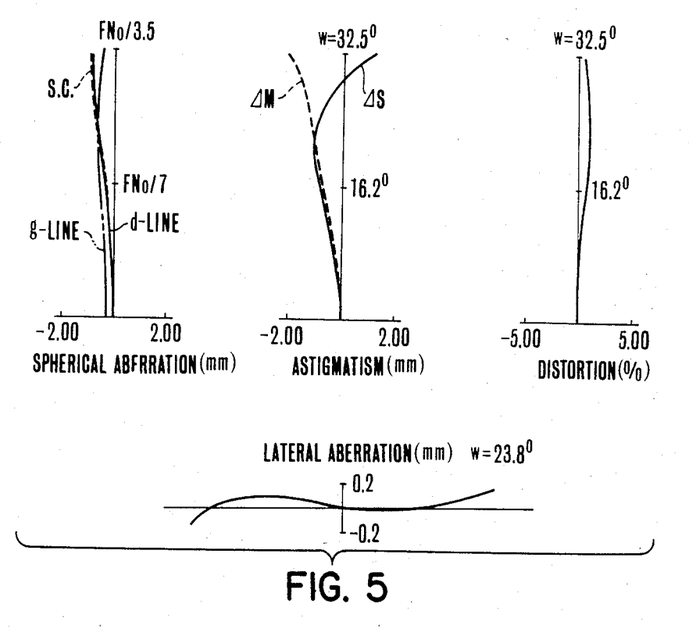
FIG. 5 is a graphic representation of the various aberrations of a second specific numerical example of the invention.
Figure 6:
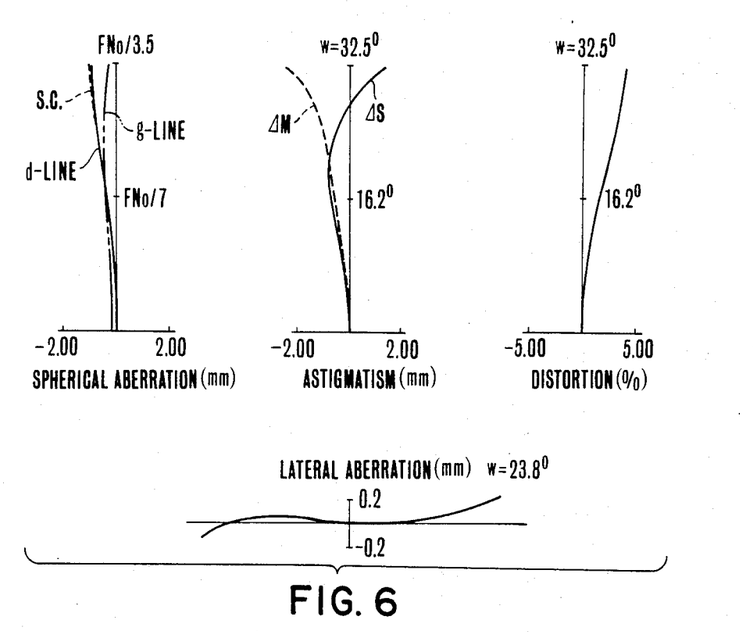
FIG. 6 is a graphic representation of the various aberrations of a third specific numerical example of the invention.
Figure 7:
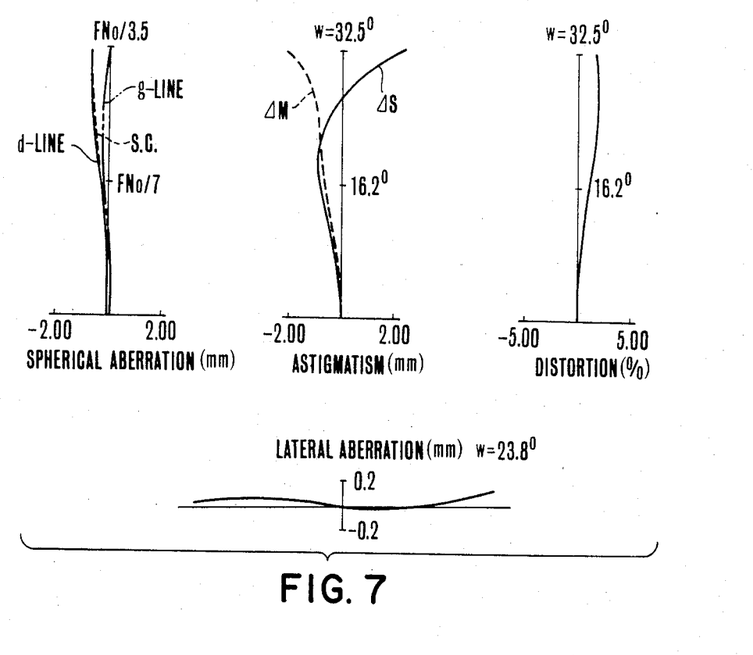
FIG. 7 is a graphic representation of the various aberrations of a fourth specific numerical example of the invention.
Figure 8:
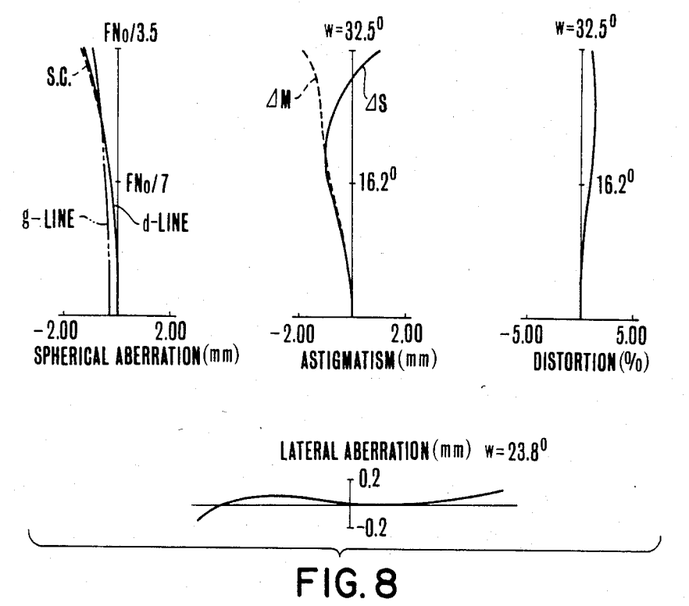
FIG. 8 is a graphic representation of the various aberrations of a fifth specific numerical example of the invention.
Figure 9:
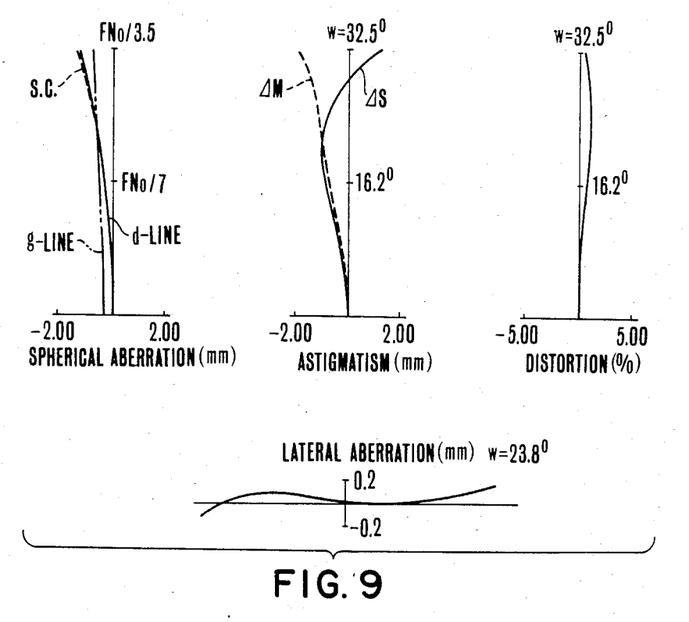
FIG. 9 is a graphic representation of the various aberrations of a sixth specific numerical example of the invention.
Figure 10:
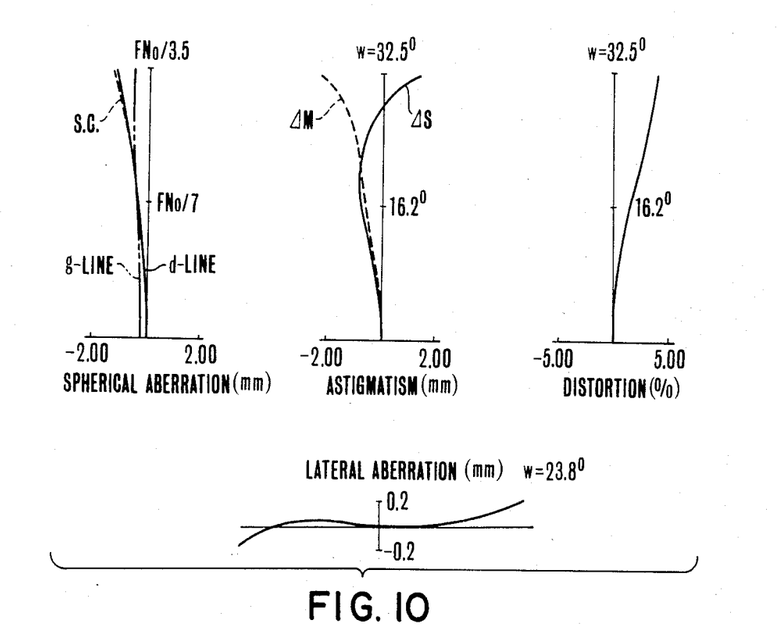
FIG. 10 is a graphic representation of the various aberrations of a seventh specific numerical example of the invention.
Figure 11:
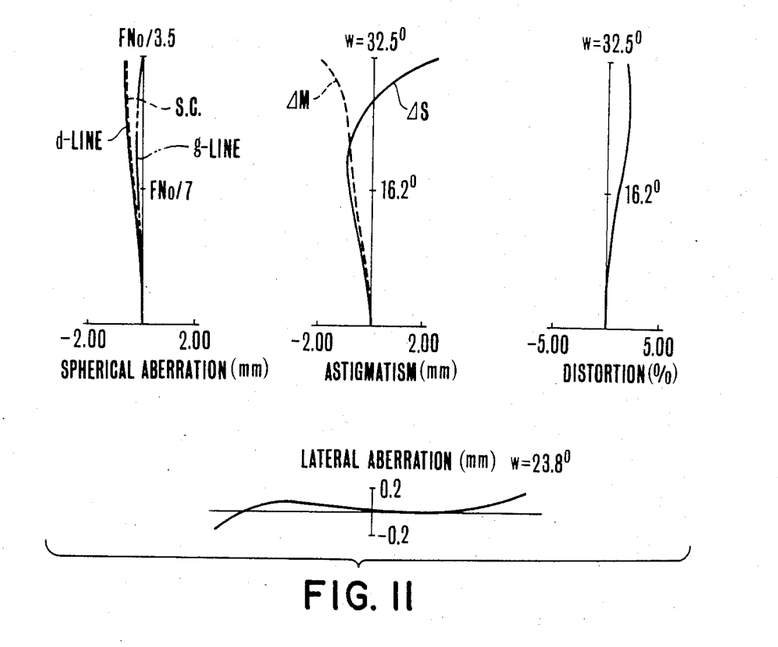
FIG. 11 is a graphic representation of the various aberrations of an eighth specific numerical example of the invention.

The effects produced by using an aspheric surface in the lens system according to the present invention appear in FIGS. 1 and 2. FIG. 1 graphically illustrates positions of the three characteristic rays of an oblique pencil having an intermediate angle of field, as it passes through a triplet objective to an image plane. The triplet objective shown includes a first lens 1 of positive power, a second lens 2 of negative power, a third lens 3 of positive power and a diaphragm 4. A light bundle 5 comes from an object at an intermediate angle in a view field. Of the rays of the light bundle 5, an upper marginal ray 6, a principal ray 7 and a lower marginal ray 8 are shown. Now assuming that all the lenses 1, 2 and 3 are defined by spherical surfaces as depicted by solid line curves, then when the total length of the objective is shortened, the lower marginal ray 8 cuts a focal plane 9 at progressively lower a point than the principal ray 7. As is obvious from a lateral aberration curve for the intermediate angular field in FIG. 2, therefore, the rays of the upper part of the light bundle 5 are focused at a curve 6", the principal ray 7 at a point 7", and the rays of the lower part at another curve 8" so that a large comatic flare is produced. Also, as indicated at ΔM, the fact that the upper marginal ray 6 passes through the focal plane 9 at a higher height than that for the principal ray 7 and the lower marginal ray 8 at a lower height represents production of an over-corrected astigmatic difference.

In order to remove this comatic flare and astigmatic difference most efficiently, according to the present invention, at least one of the refracting surfaces of the second and third lenses 2 and 3 of the lens system of FIG. 1 is made aspheric such that as the height from the optical axis increases, the negative refractive power becomes progressively weaker, or the positive refractive power becomes progressively stronger. This produces an effect of reducing the degree of refraction of the lower marginal ray 8 at that surface of the second lens 2 or the third lens 3 so that the ray 8 changes its position as indicated by a dashed line 8', arriving at a point nearer to the focus of the principal ray 7. As for the principal ray 7, the degree of refraction is greatly reduced. The upper marginal ray 6 is refracted more. As a result, a lens system having an improved lateral aberration with lesser comatic flare and halo as shown by a dashed line in FIG. 2 is realized. Though an illustrated example by FIG. 1 is to apply the aspheric surface to either the first surface 2' of the second lens 2 or the first surface 3' of the third lens 3 as indicated at 2" or 3", it should be recognized that the second surface of either one of the aforesaid lenses may be selected for employment of the aspheric surface, and that both of the surfaces of either one of the aforesaid lenses may be made aspheric.

The features of the present invention will next be described with respect to two different cases, namely when the aspheric surface is employed in the second lens 2 and in the third lens 3.

The former case involves a lens system having from front to rear, a first lens 1 with a positive refractive power, a second lens 2 with a negative refractive power, and a third lens 3 with a positive refractive power followed by a diaphragm 4. In such a system, when one of the surfaces of the second lens 2 is aspheric, construction of this aspheric surface should be such that as the height from the optical axis increases, the negative refractive power becomes progressively weaker, and satisfies the following conditions:

$$1 \times 10^{-5} < \frac{\Delta Xa}{f} < 10 \times 10^{-5} \quad (1)$$

$$1 \times 10^{-7} < \frac{\Delta Xb}{f} < 10 \times 10^{-7} \quad (2)$$

wherein $\Delta Xa$ and $\Delta Xb$ are the axial distances between the spherical surface 2' for determining the focal length of the aforesaid second lens 2 and the aspheric surface 2" at a maximum height and its half for the effectiveness of the aspheric surface 2" respectively with a direction in which the negative refractive power weakens taken as positive, and f is the focal length of the entire system.

When both of the surfaces of the second lens 2 are aspheric, letting $\Delta Xa1$ and $\Delta Xa2$ denote the above-defined axial distances at the maximum height for the front and rear surfaces respectively, and $\Delta Xb1$ and $\Delta Xb2$ those at the half of the maximum height for the front and rear surfaces respectively, the values of factors ($\Delta Xa1+\Delta Xa2$) and ($\Delta Xb1+\Delta Xb2$) fall within the same limits as those of the above-stated inequalities of conditions (1) and (2), that is, $$1 \times 10^{-5} < \frac{\Delta Xa1 + \Delta Xa2}{f} < 10 \times 10^{-5} \quad (1')$$

$$1 \times 10^{-7} < \frac{\Delta Xb1 + \Delta Xb2}{f} < 10 \times 10^{-7} \quad (2')$$

The latter of the previously mentioned two cases employs an aspheric surface or surfaces in the third lens. Such a lens system includes, from front to rear, a first lens 1 having a positive refractive power, a second lens 2 having a negative refractive power, and a third lens 3 having a positive refractive power followed by a diaphragm 4. When one of the surfaces of the third lens 3 is aspheric, the aspheric surface is constructed so that as the height from the optical axis increases, the positive refractive power becomes progressively stronger, and satisfies the following conditions:

$$-1 \times 10^{-5} < \frac{\Delta Xa}{f} < 10 \times 10^{-5} \quad (1)$$

$$0 \leq \frac{\Delta Xb}{f} < 10 \times 10^{-7} \quad (2)$$

wherein $\Delta Xa$ and $\Delta Xb$ are the axial distances between the spherical surface 3' for determining the focal length of the aforesaid third lens 3 and the aspheric surface 3" at a maximum height and its half for the effectiveness of the aspheric surface respectively from the optical axis, and f is the focal length of the entire system.

When the third lens 3 has two aspheric surfaces, letting $\Delta Xa1$ and $\Delta Xa2$ denote the above-defined axial distances at the maximum height for the front and rear surfaces respectively, and $\Delta Xb1$ and $\Delta Xb2$ those at the half of the maximum height for the front and rear surfaces respectively, the same numerical limits as those of the aforesaid conditions (1) and (2) are given for ($\Delta Xa1+\Delta Xa2$) and ($\Delta Xb1+\Delta Xb2$). That is, $$-1 \times 10^{-5} < \frac{\Delta Xa1 + \Delta Xa2}{f} < 10 \times 10^{-5} \quad (1')$$

$$0 \leq \frac{\Delta Xb1 + \Delta Xb2}{f} < 10 \times 10^{-7} \quad (2')$$

The following is the significance of each of inequalities of conditions (1) and (2) in each embodiment. In every embodiment, when the upper limit of inequalities of condition (1) is exceeded, over-correction of comatic flare results. When the lower limit is exceeded, the comatic flare becomes difficult to correct sufficiently. When the upper limit of inequalities of condition (2) is exceeded, negative spherical aberration becomes too large to prevent the image quality in the central area of the picture format from being deteriorated badly.

Though the foregoing features are sufficient for accomplishing the object of the invention, upon satisfaction of the following conditions in each embodiment, a triplet objective further well corrected for aberrations can be obtained.

| (3) | 0.35 | <D2/D4 | <1 |
|---|---|---|---|
| (4) | −4.5f | <f12 | <−2f |
| (5) | 0.5f | <f3 | <0.7f |
| (6) | 0.28f | <R1 | <0.35f |
| (7) | −4f | <R3 | <−f |
| (8) | 0.25f | <R4 | <0.4f |
| (9) | −0.9f | <R6 | <−0.7f |
| (10) | 1.7 | <N1 | |
| (11) | 1.7 | <N3 | | wherein D2 and D4 are the axial air spacings between the successive two lenses; f12 is the combined focal length of the first and second lenses; f3 is the focal length of the third lens; R1, R3, R4 and R6 are the radii of curvature of the first, third, fourth and sixth surfaces counting from the front, and N1 and N3 are the refractive indices of the glasses from which the first and third lenses are made up.

Of the above-stated conditions, the first three, or (3), (4) and (5) cooperate with one another for the purpose of choosing the image angle so as to cover a much wider view field up to $2\omega=65°$ than that the triplet lenses generally have, while still permitting a minimization of the total length of the objective and the diameter of the first lens.

The lens system of the triplet type is formed such that a negative lens is inserted into and seated in between two positive lenses. Depending upon the location of this intermediate lens of negative power, as it lies nearer the first lens of positive power (or $D2<D4$), or nearer the third lens of positive power (or $D2>D4$), it differentiates the nature of the lens system. In other words, when $D2<D4$, the first lens and the second lens may be considered to form a combined lens of negative power upon working with the third lens of positive power to approach the power distribution characteristics of the retrofocus type. The lens properties on the aberrational problem also resemble the retrofocus type, enabling the designer to choose a wide total angular field coverage. On the other hand, when $D2>D4$, the positive refractive power of the first lens and the combined negative refractive power of the second and third lenses may be considered to have a power distribution approaching that of the telephoto type lens. Because the lens properties on the aberrational problem become similar to those of the telephoto type, it is no longer suited for increasing the image angle.

According to the invention, the use of properties similar to those of the retrofocus type by $D2<D4$ provides a valuable increase in the image angle. Inequalities of condition (3) give a numerical range for this. When the upper limit is exceeded, as has been stated above, the aspect of the telephoto type is intensified so that the Petzval sum increases to the positive direction and at the same time the astigmatic difference from the intermediate to the maximum image angle is increased in a direction to be under-corrected. This makes it difficult to cover a wider angular field. At the same time, the diameter of the first lens is increased, thereby sacrificing compactness. When the lower limit is exceeded, though field curvature and astigmatic difference can be corrected relatively well, annular spherical aberration becomes too small so that the good balance of the image aberrations is broken objectionably.

Similarly, either when the lower limit of inequlities of condition (4) is exceeded, or when the upper limit of inequalities of condition (5) is exceeded, the lens system approaches the telephoto type, and under-correction of astigmatic difference in a zone from the intermediate to the maximum angular field. Either when the upper limit of condition (4) is exceeded, or when the lower limit of the conditon (5) is exceeded, the refractive power of each lens becomes too large, or the radius of curvature of each lens surface becomes too small, to fall above the lower limits of inequalities (6) and (8) and below the upper limits of inequalities (7) and (9), thereby it being made difficult to achieve good correction of aberrations.

Conditions (6), (7), (8) and (9) concern correction of mainly spherical aberration and those comatic flare and field curvature which appear in an intermediate zone of field. In the inequalities of condition (6), when the value of the radius of curvature of the first surface R1 exceeds the upper limit, over-correction of spherical aberration results in large flare. When lower limit is exceeded, under-correction of spherical aberration results. Conditions (7) and (9) concern with correction of comatic flare and field curvature. The third and sixth lens surfaces R3 and R6 are shaped so that particularly with intermediate to maximum oblique pencils, the lower marginal rays are strongly refracted in opposite directions, namely downward for the lens surface R3 and upward for the lens surface R6, to eliminate the comatic flare. Therefore, when the upper limit of the inequalities of condition (7) is exceeded, the lower marginal rays of the intermediate to the maximum oblique pencil are refracted more strongly downward and produce inward comatic flare. This is difficult to correct by the bending technique applied to the surface R6 and other lens surfaces. When the lower limit is exceeded, extreme under-correction of astigmatic difference results in a zone from the intermediate to the maximum angular field. Similarly in the inequlities of condition (9), when the value of the radius of curvature R6 exceeds the upper limit, astigmatic difference is very under-corrected in a zone from the intermediate to the maximum angular field. When the upper limit is exceeded, the lower marginal rays of the intermediate to the maximum oblique pencils are lesser refracted, producing inward comatic flare which is difficult to correct even by bending the lens surface R3 and other lens surfaces.

Condition (8) concerns with correction of spherical aberration. When the upper limit is exceeded, under-correction of spherical aberration results. When the lower limit is exceeded, spherical aberration is over-corrected objectionably.

Inequalities of conditions (10) and (11) concern correction of the Petzval sum of the entire system. When the values of the refractive indices N1 and N3 exceed the lower limits, the Petzval sum increases to the positive direction, field curvature of intermediate image angle becomes too under-corrected. If this is corrected, the astigmatic difference increases to deteriorate the imaging performance extremely badly.

As has been described above, according to the present invention, a lens system of increased total angular field coverage with a faster speed and a compact form can be achieved.

Though the foregoing illustrated embodiments of the invention have been described in connection with the examples of application of one aspheric surface to either the second, or the third lens, or of two aspheric surfaces to one and the same lens, it is also possible to provide for each of the second and third lenses with one aspheric surface. The use of two aspheric surfaces in a single lens system is preferable to the use of only one aspheric surface from the standpoint of manufacturing the aspheric surfaces with ease, because the required aspheric quantity is dispersed over the two surfaces.

In the lens system of the invention, focusing is performed either by moving the lens system as a whole, or by moving one lens, for example, the third lens alone. The latter focusing method is preferable, because the lens driving power is lessened. It is to be also noted that during focusing, the diaphragm may be either moved or held stationary.

Eight examples of specific triplet objectives can be constructed in accordance with the numerical data given in the following tables for the radii of curvature, R, the axial thicknesses and air spacings, D, and the refractive indices, N, and Abbe numbers, $\nu$, of the glasses from which the lens elements are made up with the usual subscripts numbered consecutively from front to rear. In the figures illustrating the aberration curves, M denotes the meridional image surface and S the sagittal image surface.

An equation for the aspheric surface in a rectangular coordinate with an X-axis in the optical axis and Y-axis in a direction perpendicular to the optical axis, taking the direction in which light advances as positive and the intersection of the X-axis and Y-axis as an original point, is expressed by:

$$X = \frac{\frac{1}{R} Y^2}{1 + \sqrt{1 - \left(\frac{Y}{R}\right)^2}} + AY^2 + BY^4 + CY^6 + DY^8 + EY^{10}$$

wherein R is the radius of curvature of the reference spherical surface, and A, B, C, D and E are the aspherical coefficients.

Specific numerical examples 1 and 2 use one aspheric surface in the front or rear surface of the second lens respectively, specific numerical examples 3 and 4 use two aspheric surfaces in both of the surfaces of the second lens, specific numerical examples 5 and 6 use one aspheric surface in the front or rear surfaces of the third lens respectively, and specific numerical examples 7 and 8 use two aspheric surfaces in both of the surfaces of the third lens.

Example 1

F = 100    FNO = 1:3.5    2ω = 65°

| | | | |
|---|---|---|---|
| R1 = 30.22 | D1 = 9.42 | N1 = 1.77250 | ν1 = 49.6 |
| R2 = 94.14 | D2 = 2.61 | | |
| *R3 = −184.72 | D3 = 2.88 | N2 = 1.69895 | ν2 = 30.1 |
| R4 = 30.17 | D4 = 5.55 | | |
| R5 = 153.17 | D5 = 5.31 | N3 = 1.88300 | ν3 = 40.8 |
| R6 = −85.57 | D6 = 3.53 | | |

D2/D4 = 0.471
f12 = −3.44f
f3 = 0.628f
Telephoto Ratio = 1.06

Aspheric Coefficients for the surface R3
A = B = 0
C = 1.05 × 10$^{-10}$
D = 4.57 × 10$^{-13}$
E = 2.00 × 10$^{-15}$
$\frac{\Delta Xa1}{f} = 3.53 \times 10^{-5}$

Example 2

F = 100    FNO = 1:3.5    2ω = 65°

| | | | |
|---|---|---|---|
| R1 = 29.68 | D1 = 9.16 | N1 = 1.84100 | ν1 = 43.2 |
| R2 = 90.53 | D2 = 2.49 | | |
| R3 = −251.74 | D3 = 2.35 | N2 = 1.72825 | ν2 = 28.5 |
| *R4 = 28.04 | D4 = 6.42 | | |
| R5 = 130.34 | D5 = 4.72 | N3 = 1.72000 | ν3 = 43.7 |
| R6 = −72.06 | D6 = 3.53 | | |

D2/D4 = 0.388
f12 = −4.28f
f3 = 0.651f
Telephoto Ratio = 1.04

Aspheric Coefficients for the surface R4
A = B = 0
C = −3.18 × 10$^{-10}$
D = −2.10 × 10$^{-12}$
E = −1.34 × 10$^{-14}$

Example 3

F = 100    FNO = 1:3.6    2ω = 65°

Example 3-continued

| | | | |
|---|---|---|---|
| R1 = 29.45 | D1 = 9.26 | N1 = 1.81600 | ν1 = 46.6 |
| R2 = 84.28 | D2 = 4.15 | | |
| *R3 = −205.76 | D3 = 2.34 | N2 = 1.76180 | ν2 = 27.1 |
| *R4 = 28.71 | D4 = 4.73 | | |
| R5 = 111.99 | D5 = 4.19 | N3 = 1.83400 | ν3 = 37.2 |
| R6 = −82.08 | D6 = 3.53 | | |

D2/D4 = 0.877
f12 = −2.813f
f3 = 0.574f
Telephoto Ratio = 1.01

Aspheric Coefficients for the surface R3
A = B = 0
C = 9.09 × 10$^{-11}$
D = 3.68 × 10$^{-13}$
E = 4.86 × 10$^{-15}$ Aspheric Coefficients for the surface R4
A = B = 0
C = −1.91 × 10$^{-10}$
D = −1.26 × 10$^{-12}$
E = −7.89 × 10$^{-15}$

Example 4

F = 100    FNO = 1:3.5    2ω = 65°

| | | | |
|---|---|---|---|
| R1 = 33.24 | D1 = 11.65 | N1 = 1.77250 | ν1 = 49.6 |
| R2 = 94.62 | D2 = 4.92 | | |
| *R3 = −118.35 | D3 = 2.34 | N2 = 1.75520 | ν2 = 27.5 |
| *R4 = 35.21 | D4 = 5.22 | | |
| R5 = 132.04 | D5 = 4.24 | N3 = 1.88300 | ν3 = 40.8 |
| R6 = −72.01 | D6 = 3.53 | | |

D2/D4 = 0.943
f12 = −2.13f
f3 = 0.533f
telephoto Ratio = 1.06

Aspheric Coefficients for the surface R3
A = B = 0
C = 3.14 × 10$^{-10}$
D = 1.37 × 10$^{-12}$
E = 6.07 × 10$^{-15}$ Aspheric Coefficients for the surface R4
A = B = 0
C = 6.36 × 10$^{-10}$
D = 2.10 × 10$^{-12}$
E = 1.34 × 10$^{-14}$

Example 5

F = 100    FNO = 1:3.5    2ω = 65°

| | | | |
|---|---|---|---|
| R1 = 30.22 | D1 = 9.42 | N1 = 1.77250 | ν1 = 49.6 |
| R2 = 94.14 | D2 = 2.61 | | |
| R3 = −184.72 | D3 = 2.88 | N2 = 1.69895 | ν2 = 30.1 |
| R4 = 30.17 | D4 = 5.55 | | |
| *R5 = 153.17 | D5 = 5.31 | N3 = 1.88300 | ν3 = 40.8 |
| R6 = −85.57 | D6 = 3.53 | | |

D2/D4 = 0.471
f12 = −3.44f
f3 = 0.628f
Telephoto Ratio = 1.06

Aspheric Coefficients for the surface R5
A = B = 0
C = 3.63 × 10$^{-10}$
D = 2.63 × 10$^{-12}$
E = 1.94 × 10$^{-14}$

Example 6

F = 100    FNO = 1:3.5    2ω = 65°

| | | | |
|---|---|---|---|
| R1 = 29.68 | D1 = 9.16 | N1 = 1.84100 | ν1 = 43.2 |
| R2 = 90.53 | D2 = 2.49 | | |
| R3 = −251.74 | D3 = 2.35 | N2 = 1.72825 | ν2 = 28.5 |
| R4 = 28.04 | D4 = 6.42 | | |
| R5 = 130.34 | D5 = 4.72 | N3 = 1.72000 | ν3 = 43.7 |
| *R6 = −72.06 | D6 = 3.53 | | |

D2/D4 = 0.388
f12 = −4.28f
f3 = 0.651f
Telephoto Ratio = 1.04

Aspheric Coefficients for the surface R6
A = B = 0
C = −4.54 × 10$^{-10}$
D = −3.41 × 10$^{-12}$
E = −2.43 × 10$^{-14}$

Example 7

| | | | |
|---|---|---|---|
| F = 100 | FNO = 1:3.6 | 2ω = 65° | |
| R1 = 29.45 | D1 = 9.26 | N1 = 1.81600 | ν1 = 46.6 |
| R2 = 84.28 | D2 = 4.15 | | |
| R3 = −205.76 | D3 = 2.34 | N2 = 1.76180 | ν2 = 27.1 |
| R4 = 28.71 | D4 = 4.73 | | |
| *R5 = 111.99 | D5 = 4.19 | N3 = 1.83400 | ν3 = 37.2 |
| *R6 = −82.08 | D6 = 3.53 | | |

| | | |
|---|---|---|
| D2/D4 = 0.877 | Aspheric Coefficients for the surface R5 | Aspheric Coefficients for the surface R6 |
| f12 = −2.813f | | C = −2.27 × $10^{-10}$ |
| f3 = 0.574f | A = B = 0 | D = −1.73 × $10^{-12}$ |
| Telephoto Ratio = 1.01 | C = 2.50 × $10^{-10}$ | E = −6.07 × $10^{-15}$ |
| | D = 1.73 × $10^{-12}$ | |
| | E = 1.21 × $10^{-14}$ | |

Example 8

| | | | |
|---|---|---|---|
| F = 100 | FNO = 1:3.5 | 2ω = 65° | |
| R1 = 33.24 | D1 = 11.65 | N1 = 1.77250 | ν1 = 49.6 |
| R2 = 94.62 | D2 = 4.92 | | |
| R3 = −118.35 | D3 = 2.34 | N2 = 1.75520 | ν2 = 27.5 |
| R4 = 35.21 | D4 = 5.22 | | |
| *R5 = 132.04 | D5 = 4.24 | N3 = 1.88300 | ν3 = 40.8 |
| *R6 = −72.01 | D6 = 3.53 | | |

| | | |
|---|---|---|
| D2/D4 = 0.943 | Aspheric Coefficients for the surface R5 | Aspheric Coefficients for the surface R6 |
| f12 = −2.13f | | C = 1.36 × $10^{-9}$ |
| f3 = 0.533f | A = B = 0 | D = 9.45 × $10^{-12}$ |
| Telephoto Ratio = 1.06 | C = 1.09 × $10^{-9}$ | E = 3.64 × $10^{-14}$ |
| | D = 7.88 × $10^{-12}$ | |
| | E = 6.07 × $10^{-14}$ | |

| | Numerical Examples | | | | | | | |
|---|---|---|---|---|---|---|---|---|
| | 1 | 2 | 3 | 4 | 5 | 6 | 7 | 8 |
| ΔXa1/f | 3.53 × $10^{-5}$ | 0 | 2.35 × $10^{-5}$ | 7.71 × $10^{-5}$ | 2.38 × $10^{-5}$ | 0 | 1.03 × $10^{-5}$ | 4.76 × $10^{-5}$ |
| ΔXa2/f | 0 | 3.38 × $10^{-5}$ | 0.91 × $10^{-5}$ | −3.15 × $10^{-5}$ | 0 | 2.44 × $10^{-5}$ | 0.85 × $10^{-5}$ | −4.97 × $10^{-5}$ |
| (ΔXa1 + ΔXa2)/f | 3.53 × $10^{-5}$ | 3.38 × $10^{-5}$ | 3.26 × $10^{-5}$ | 4.56 × $10^{-5}$ | 2.38 × $10^{-5}$ | 2.44 × $10^{-5}$ | 1.88 × $10^{-5}$ | −0.21 × $10^{-5}$ |
| ΔXb1/f | 2.94 × $10^{-7}$ | 0 | 1.2 × $10^{-7}$ | 5.88 × $10^{-7}$ | 1.18 × $10^{-7}$ | 0 | 1.18 × $10^{-7}$ | 2.94 × $10^{-7}$ |
| ΔXb2/f | 0 | 2.94 × $10^{-7}$ | 1.2 × $10^{-7}$ | −2.94 × $10^{-7}$ | 0 | 2.94 × $10^{-7}$ | 1.18 × $10^{-7}$ | −2.94 × $10^{-7}$ |
| (ΔXb1 + ΔXb2)/f | 2.94 × $10^{-7}$ | 2.94 × $10^{-7}$ | 2.4 × $10^{-7}$ | 2.94 × $10^{-7}$ | 1.18 × $10^{-7}$ | 2.94 × $10^{-7}$ | 2.36 × $10^{-7}$ | 0 |

What I claim:

1. A triplet type comprising:
(a) a first lens component having a positive refractive power;
(b) a second lens component on the image side of said first lens component having a negative refractive power, one surface of said second lens component being aspheric such that as the height from the optical axis increases, the negative refractive power becomes weaker;
(c) a third lens component on the image side of said second lens component and having a positive refractive power; and
(d) a diaphragm on the image side of said third lens component;
said second lens component satisfying the following conditions:

$$1 \times 10^{-5} < \frac{\Delta Xa}{f} < 10 \times 10^{-5}$$

$$1 \times 10^{-7} < \frac{\Delta Xb}{f} < 10 \times 10^{-7}$$

wherein ΔXa and ΔXb are the axial distances between the spherical surface for determining the focal length of said second lens component and the aspheric surface at a maximum height for the effectiveness of the aspheric surface and at the half of said maximum height respectively with the direction in which the negative refractive power weakens as positive, and f is the focal length of the entire system.

2. A triplet type lens comprising:
(a) a first lens component having a positive refractive power;
(b) a second lens component lying on the image side of said first lens component and having a negative refractive power, both of the lens surfaces of said second component being aspheric such that as the height from the optical axis increases, the negative refractive power becomes weaker;
(c) a third lens component lying on the image side of said second lens component and having a positive refractive power; and
(d) a diaphragm lying on the image side of said third lens component;
said second lens component satisfying the following conditions:

$$1 \times 10^{-5} < \frac{\Delta Xa1 + \Delta Xa2}{f} < 10 \times 10^{-5}$$

$$1 \times 10^{-7} < \frac{\Delta Xb1 + \Delta Xb2}{f} < 10 \times 10^{-7}$$

wherein ΔXa1 and ΔXa2 are the axial distances between the spherical surface for determining the focal length of said second lens component and the aspheric surface in the front and rear lens surfaces thereof at a maximum height for the effectiveness of said aspheric surface respectively with the direction in which the negative refractive power weakens as positive, ΔXb1 and ΔXb2 are the axial distances in the front and rear lens surfaces at the half of said maximum height respectively, and f is the focal length of the entire system.

3. A triplet type lens comprising:
(a) a first lens component having a positive refractive power;
(b) a second lens component lying on the image side of said first lens component and having a negative refractive power;
(c) a third lens component lying on the image side of said second lens component and having a positive refractive power, one of the lens surfaces of said third lens component being aspheric such that as the height from the optical axis increases, the positive refractive power becomes stronger; and
(d) a diaphragm lying on the image side of said third lens component;
(e) said third lens component satisfying the following conditions:

$$-1 \times 10^{-5} < \frac{\Delta Xa}{f} < 10 \times 10^{-5}$$

$$0 \leq \frac{\Delta Xb}{f} < 10 \times 10^{-7}$$

wherein $\Delta Xa$ and $\Delta Xb$ are the axial distances between the spherical surface for determining the focal length of said third lens component and the aspheric surface at a maximum height for the effectiveness of the aspheric surface and at the half of said maximum height respectively with the direction in which the positive refractive power weakens as positive, and f is the focal length of the entire system.

4. A triplet type lens comprising:
(a) a first lens component having a positive refractive power;
(b) a second lens component lying on the image side of said first lens component and having a negative refractive power;
(c) a third lens component lying on the image side of said second lens component and having a positive refractive power, both of the lens surfaces of said third lens component being aspheric such that as the height from the optical axis increases, the positive refractive pwer becomes stronger;
(d) a diaphragm lying on the image side of said third lens component; said third lens component satisfying the following conditions:

$$-1 \times 10^{-5} < \frac{\Delta Xa1 + \Delta Xa2}{f} < 10 \times 10^{-5}$$

-continued
$$0 \leq \frac{\Delta Xb1 + \Delta Xb2}{f} < 10 \times 10^{-7}$$

wherein $\Delta Xa1$ and $\Delta Xa2$ are the axial distances between the spherical surface for determining the focal length of said third lens component and the aspheric surface in the front and rear lens surfaces thereof at a maximum height for the effectiveness of said aspheric surface respectively with the direction in which the positive refractive power weakens as positive, $\Delta Xb1$ and $\Delta Xb2$ are the axial distances in the front and rear lens surfaces at the half of said maximum height respectively, and f is the focal length of the entire system.

5. A triplet type lens according to claim 1, 2, 3, or 4, satisfying the following conditions:

| 0.35 | < D2/D4 | < 1 |
| --- | --- | --- |
| −4.5f | < f12 | < −2f |
| 0.5f | < f3 | < 0.7f |
| 0.28f | < R1 | < 0.35f |
| −4f | < R3 | < −f |
| 0.25f | < R4 | < 0.4f |
| −0.9f | < R6 | < −0.7f |
| 1.7 | < N1 | |
| 1.7 | < N3 | | wherein f12 is the combined focal length of said first and said second lens components; f3 is the focal length of said third lens component; Ri is the radius of curvature of the i-th lens surface counting from the front; Di is the i-th lens thickness or air spacing counting from the front; and Ni is the refractive index of the medium of the i-th lens component counting from the front.

* * * * *